US007000333B2

(12) United States Patent
Yarem

(10) Patent No.: US 7,000,333 B2
(45) Date of Patent: Feb. 21, 2006

(54) ANIMAL BYPRODUCT CONVERSION SYSTEM AND METHOD

(75) Inventor: Robert J. Yarem, deceased, late of Gainesville, GA (US); by Alexis A. Yarem, legal representative, Gainesville, GA (US)

(73) Assignee: ABC, LLC, Gainesville, GA (US)

( * ) Notice: Subject to any disclaimer, the term of this patent is extended or adjusted under 35 U.S.C. 154(b) by 0 days.

(21) Appl. No.: 10/762,017

(22) Filed: Jan. 21, 2004

(65) Prior Publication Data

US 2005/0155247 A1 Jul. 21, 2005

(51) Int. Cl.
*F26B 17/00* (2006.01)
(52) U.S. Cl. .............................. 34/380; 34/384; 34/386; 34/61
(58) Field of Classification Search .................. 34/371, 34/380, 384, 386, 60, 61; 426/646, 465, 426/443, 519

See application file for complete search history.

(56) References Cited

U.S. PATENT DOCUMENTS

| 4,067,119 | A | * | 1/1978 | Overton ........................ 34/384 |
| 4,252,282 | A | * | 2/1981 | Vermeulen et al. .......... 241/236 |
| 4,384,009 | A | * | 5/1983 | Lewis et al. ................. 426/646 |
| 4,573,278 | A |   | 3/1986 | Ruiz-Avila |
| 5,105,560 | A |   | 4/1992 | Ruiz-Avila et al. |
| 5,384,149 | A | * | 1/1995 | Lin ............................. 426/646 |
| 5,540,932 | A | * | 7/1996 | Lanter et al. ................ 424/442 |

FOREIGN PATENT DOCUMENTS

| WO | WO 87/05562 | 9/1987 |
| WO | WO 91/06816 | 5/1991 |
| WO | WO 00/01256 | 1/2000 |

OTHER PUBLICATIONS

*AKT-KIX Technology—What is the KIX System?*, Internet article, pp. 1-2, AKT International Pty. Ltd. (2000), at http://www.akt-kix.com/english/whatitis.htm.
"Installation and Maintenance Instructions", Gear Reducers and Gearmotors, Instruction Manual in Italian and English, 3-99/4 - 10 000 1 GB, pp. 1-12, UT. D 045 Rev. 1, Rossi Motoriduttori, Modena—Italia.
J. L. Ruiz-Avila, "Restaurant Waste Recycling Hawaii", *Draft* Report, Feb. 17, 2000, pp. 1-5, Report No. 827, AKT-KIX Trading as AKT international pty limited, acn 083 560 543, Sydney Australia.
"Sanitary Positive Displacement Pumps", Brochure/Bulletin, Jul., 1995, MR6.94 1500, 01.30.0A, Sine Pump, Arvada, Colorado, USA.
"The Experience to Handle it Right!", Catalog 189B, Copyright 1989, pp. 1-22, Screw Conveyor Corporation, Atlanta, Georgia, USA.
"MM55 plus—The Right Choice for On-Line Analysis", Brochure 76/11474-01 Issue 2, Nov. 1999, NDC Infrared Engineering, Irwindale, California, USA.
"SCC Bucket Elevators for Industrial Service", Catalog No. 788A, pp. 1-1 6, Screw Conveyor Corporation, Hammond, Indiana, USA.

(Continued)

Primary Examiner—Kenneth Rinehart
(74) Attorney, Agent, or Firm—Fay, Sharpe, Fagan Minnich & McKee, LLP

(57) ABSTRACT

A system for recovering nutrients from animal byproducts includes a grinder, a separator, and a dehydrator. The grinder is adapted to reduce the animal byproduct into smaller particles. The separator is adapted to separate the animal byproduct into water, oil and solids. The dehydrator is adapted to dry the solid material of the animal byproduct. A method for recovering nutrients from animal byproducts includes grinding animal byproduct material, separating protein from the animal byproduct material to produce a meal, and drying the meal.

19 Claims, 2 Drawing Sheets

OTHER PUBLICATIONS

"Screw Lift Conveyor for Efficient Evaluation—When Your Handling Problem Calls for Elevating Bulk Materials", Brochure, pp. 1-12, Screw Conveyor Corporation, Hammond, Indiana, USA.

"Aero-Conveyors—The Economical and Efficient Method for Moving Dry Material", Brochure, A Vac-U-Max Company, Copyright 1999, 8 pages Belleville, New Jersey, USA.

"Progressive Cavity Pump Eases DOA Transfer at George's Inc.", *Poultry* Magazine, Field Report, Oct./Nov., 2000, pp. 42-44, USA.

"When it Comes to Emulsions, We are:", *Meal Processing Magazine*, Advertisement, Sep. 2000, p. 78, "No. 400 on Inquiry Card", USA.

"Super-Flo—Drag Conveyors for Dependable Service", Screw Conveyor Corporation, Catalog No. 988D, pp. 1-12, Hammond, Indiana, USA.

J.L. Ruiz-Avila; AKT-KIX; Report No. 728, Review of the Sorin/Conti Recycling Project Adopting a Compound Feed Approach; Mar. 7, 1999 (7 pages).

J.L. Ruiz-Avila; Report No. 810, KIX Processing Capability; Feb. 12, 1999 (10 pages).

* cited by examiner

ANIMAL BYPRODUCT CONVERSION SYSTEM AND METHOD

BACKGROUND OF THE INVENTION

This invention relates to a system for recovering nutrients from unusable animal byproducts. More particularly, the invention relates to a complete system for recovering protein and fat from poultry byproducts; however, the system is also amenable to other applications, such as recovering nutrients from beef, pork or fish byproducts. The system also has applications in producing a fertilizer in which the unusable byproducts can be converted into a biomass for application in growing fields for plants and animals.

A traditional system used to convert unusable animal byproducts into usable materials, such as dried protein and raw fats, is based on the action of squeezing water from heated material. The animal byproduct material is transported via truck from an originating site, such as a poultry processing plant, to a rendering plant. In a traditional rendering or byproduct recovery system, the animal byproduct material is loaded into a loading hopper. From the hopper, the material is transferred to a massive pressurized kettle where the material is heated. These cooking kettles collect the material in giant batches and raise the temperature of the material to 160 degrees F. for up to 65 minutes.

In this process, as the material is heated, a conductive energy transfer system takes effect. The surface heat coefficient of the animal byproduct material in the heating kettle is low, therefore the heat transfer rate is high. As heat is transferred into the material, the water and water-based substances in the byproduct begin to vaporize, causing the cell walls to lyse under the increased and sustained partial pressures within the cells. This action releases the water and water-based substances from the solids.

Because the process lasts for up to 65 minutes, the increased heat levels allow the amino acid structures in the animal byproduct material to denature. As proteins denature, the change in carboxyl and carbonyl groups allow more moisture to be driven off, leaving an altered, shorter amino acid chain in the protein structure.

Additionally, the fat molecules in the animal byproduct material are emulsified as a result of this process, and the fats and lipids separate from the solid materials. The fatty acids have the opportunity to separate from the base glycerol, creating an increased possibility of amplified deterioration of the fat materials. Because fats are hydrophobic by nature, they also separate from the water that has been released from the solid materials.

After the moisture is driven off and the material has been transformed into a collection of solid materials, fats, and water, an odor emanates as is natural from cooking biological materials. This odor is cleaned by bio-scrubbers that act as giant baffles that push the positive airflow through wet screens, dry screens and spray heads.

From the cooking kettles, the material is transferred to a squeeze press. Because the kettles process materials in a batch production method, the presses are usually large tables with pressing heads that put top pressure on the material. The principle is to use pressure to squeeze water from the material. Some systems use a wringing system in which the materials that come out of the cooking kettles are passed through a wringer. The wringer is usually designed as two rollers that have a preset space through which the material can pass. The water falls off to the side, and is called "stic water."

After the pressing or squeezing process, the material can be transferred to a tumble dryer to be sold as a compound feed material, or it can be transferred to a centrifuge to further separate the oils, water, and protein meal. The protein is dried in tumblers and then transferred to a storage bin. The oils are collected in a storage vat for sale to a consumer of raw fats. The wastewater is processed through conventional waste water treatment methods.

The traditional byproduct recovery system is slow and requires significant capital outlays for the large machinery of the system. Not only is the traditional system expensive to set up, it is also expensive to operate. Furthermore, the traditional byproduct recovery system gives off pungent odors and results in a large amount of waste causing environmental problems. The traditional system produces a protein product that has denatured significantly.

Other known animal byproduct processing systems use a dehydrator that is similar to the apparatus described in U.S. Pat. No. 5,105,560, which is incorporated herein by reference. For recovery of nutrients from chicken byproducts, these systems primarily recover the offal or feathers of a chicken. The blood, dead on arrivals ("DOAs"), bones and fat can be discarded or recovered using another method, or can be processed using the same method, either in conjunction with the aforementioned or mutually exclusively from the aforementioned system. By using the aforementioned system to process blood, DOAs and bone materials, the quality of amino acid profiles is significantly reduced as these materials are mostly composed of proteins.

In all scenarios, protein and fat quality is diminished because of the exposure to consistently high temperatures over an extended period of time with regard to individual batches, which is also varied from batch to batch. Also, the end result of compound processing yields a consistent protein and fat product that does not account for the value of individual raw materials.

Accordingly, it is desirable to provide an animal byproduct recovery system that can provide a fresher recycled material at substantially reduced process times. Furthermore, it is desirable to provide a system that has the option to be located on the premises of a processing plant, to obviate the need to transport the animal byproduct. It is also desirable to provide a protein meal that is less denatured than protein meals produced by known methods. Proteins that are less denatured are more digestible by the animal, which results in higher quality growth of the animal. Additionally, it is desirable to provide a system that is more environmentally friendly, as well as other advantages that can be understood by one skilled in the art who reads the following description.

SUMMARY OF THE INVENTION

According to a first aspect of the invention, a system for recovering nutrients from animal byproducts is provided. The system includes a grinder, a separator, and a dehydrator. The grinder is adapted to reduce the animal byproduct into smaller particles. The separator is adapted to separate the animal byproduct into water, oil and solids. The dehydrator is adapted to dry the solids of the animal byproduct.

According to another aspect of the invention, a method for recovering nutrients from animal byproducts is provided. The method includes grinding animal byproduct material, separating protein from the animal byproduct material to produce a meal, and drying the meal. The grinding step reduces the diameter of the animal byproduct material. The separating step divides the animal byproduct into oil, water and protein. The drying step flash dries the meal.

According to yet another aspect of the invention, a method of recovering nutrients from animal byproducts to form a base material is provided. Animal byproduct material is received from an on-site poultry processing plant. The animal byproduct material is ground to between about 4 mm to about 25 mm particles. The particles are heated in a continuous heater. The particles are separated into water, fat, and protein material. The protein material is dried.

DETAILED DESCRIPTION OF THE INVENTION

The inventive system for recovering protein and fat from unusable animal byproducts includes, among other novel features, a new manner in which water, oil and protein are separated from the animal byproducts. The inventive process for recovering protein and fat from unusable animal byproducts can be a continuous process, as opposed to the traditional batch system. Even though one embodiment will be described in particularity, it is understood that the invention includes alternative embodiments that come within the scope of the appended claims.

Figure 1:
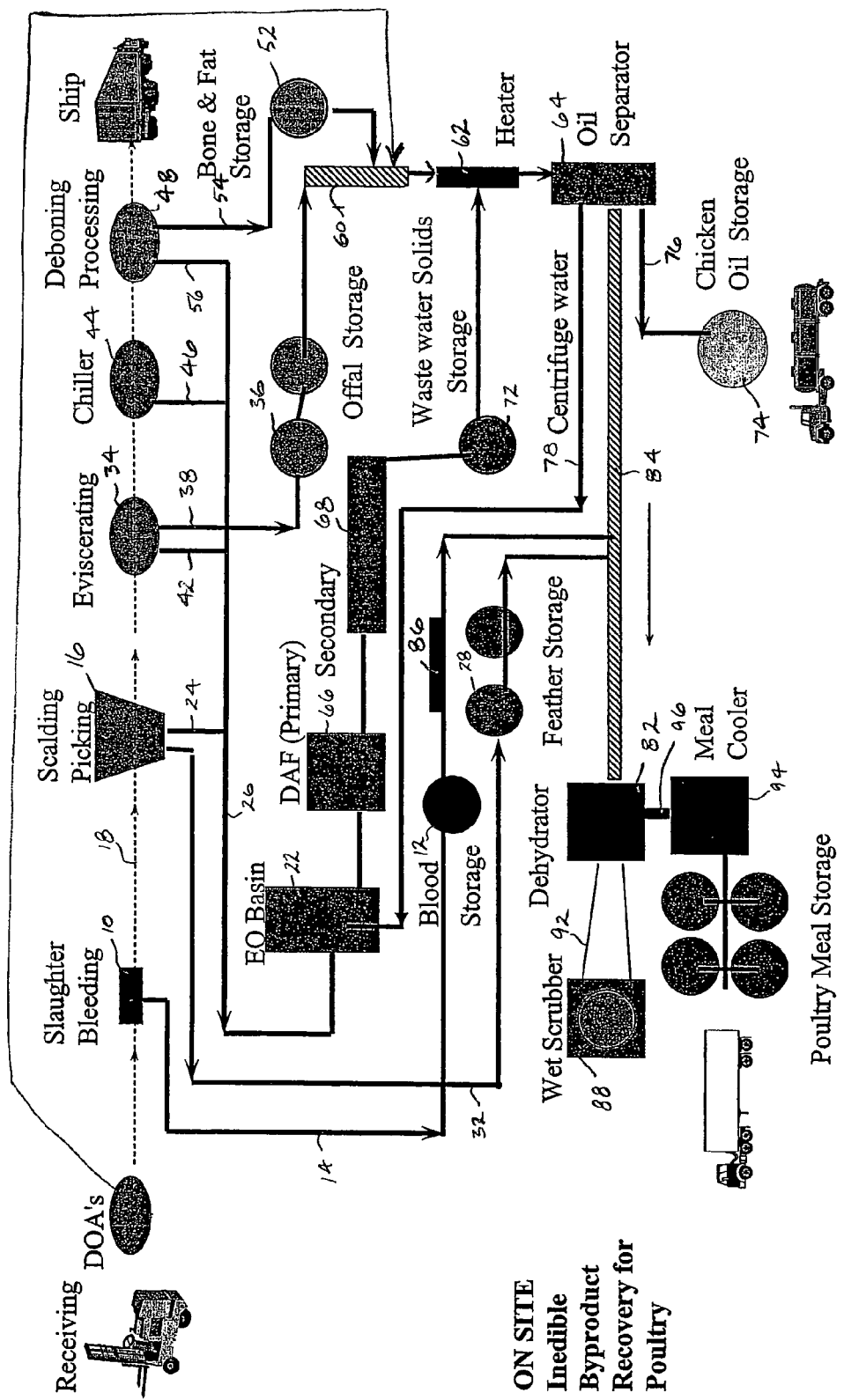
FIG. 1 is a flow diagram of a poultry processing system including a byproduct recovery system according to the present invention.

Referring to FIG. 1, in a poultry processing facility, a chicken enters a slaughtering and bleeding area 10, where the chicken is killed and bled. The blood is transferred to a blood storage tank 12 along path 14 and the chicken is transferred to a scalding and picking area 16 along path 18, where the feathers are removed. Water used in the scalding process is transferred to a wastewater storage basin 22 along path 24 which intersects path 26. The storage basin in this embodiment is an equalization basin. The equalization basin is a basin in which wastewater is unified by being allowed to settle out. The feathers removed in the picking process are transferred to a feather storage area 28 along path 32.

The chicken moves along path 18 to an eviscerating area 34, where the offal is removed. Offal removed in the eviscerating area 34 is transferred to an offal storage area 36 via path 38. Water used in the eviscerating area 34 is transferred to the storage basin 22 via path 42 which intersects path 26. The chicken then moves on to a chiller 44. Water used in the chiller 44 is transferred to the storage basin 22 via path 46 which intersects path 26. The chicken then moves on to a deboning area 48, where bone and some fat are removed. The bone and fat removed in the deboning area moves to a bone and fat storage area 52 via path 54 and water used in the deboning area is transferred to the storage basin 22 via path 56 which intersects path 26. The chicken is then packaged for shipment to the consumer.

The animal byproduct material that is recycled from a poultry processing system according to the present invention can include any part of the chicken that is not sold to the consumer, including dead on arrivals ("DOAs"), blood, feathers, offal, fat and bones. Furthermore, the system can be located either on the premises of a poultry processing plant, or off-site. The offal from the offal storage area 36, the bone and fat from the bone and fat storage area 52 and the DOAs are fed into a grinder 60. The grinder in this particular embodiment is a high-speed continuous grinder that grinds the animal byproduct into smaller particles, which according to this embodiment, are about 4 mm in diameter. The particles can be larger, such as 10 mm, but it is preferred that the particles be less than 25 mm. Because the grinder reduces the particle size, the extraction process occurs over a drastically reduced surface area. As the incoming animal byproduct material is ground into the predetermined diameter, water is released from its holding capacity within the protein and fat particles. Oils rise to the top of the animal byproduct mixture and the protein materials float in suspension in the mixture. The grinding facilitates the separation of the protein and fat by allowing the water to escape from the cells of the byproduct without the addition of heat. Too much heat can allow steam to develop in the cells causing them to lyse.

The grinder of this embodiment includes two reverse direction rotating knives with a 4 mm grinding plate to reduce the particle size down to a diameter of about 4 mm. The diameter size can be adjusted by replacing the grinding plate with the desired size. The size and capacity of the grinder depends upon the product flow or throughput desired. Such a grinder can be purchased from Pappas, Inc., 575 E. Milwaukee St., Detroit, Mich., 48202. Other grinding mechanisms that can reduce the diameter of animal byproducts can also be used in lieu of the aforementioned grinder.

The animal byproduct mixture passes through a heater 62 after leaving the grinder 60. The heater in this particular embodiment is an inline heater that preferably injects steam into the animal byproduct particles, which may be a paste after grinding. The animal byproduct mixture can spend less than ten seconds in the inline heater. The steam injection allows the animal byproduct particles or paste to be brought up to about 160 degrees F. before reaching a separator 64. At 160 degrees, the fats begin to become separated from their source. The heating of the animal byproduct continues the emulsification process begun in the grinding step.

The heater in this particular embodiment is available from KOMAX Systems, P.O. Box 1323, Wilmington, Calif. 90748. Other heaters that can fulfill the function described can also be used. As just one example, an alternative heater can include a steel cone-shaped drum having steam bars running in parallel cross patterns that provide a steam injection heating apparatus.

The steam is produced from water that was stored in the storage basin 22 that has passed through a primary filtration unit 66 and a secondary filtration unit 68. The primary filtration unit is a dissolved air floatation unit. A dissolved air flotation unit is a collection basin that has normal air forced into the water flowing through it by way of an oxygenating pump, i.e. a recirculation pump. The pump allows individual molecules of air, specifically oxygen, to attach to and react with charged particulate matter that is in the water through the application of either a magnetic source or a chemically-induced reactive substance. The secondary filtration unit is a replica of the primary filtration unit. The secondary filtration unit is designed to remove impurities left in the wastewater that the primary unit does not remove. Solids that are removed from the water are transferred to a waste water solids storage area 72. The water filtration system described is only an example of the many wastewater treatment facilities that can be used to comply with regulations.

As the animal byproduct mixture is heated the oil emulsifies while the proteins remain in a substantially natural state. The less denatured the protein, the higher quality the feed ingredient. Also, the oils are allowed to bond together through heated hydrogen bonds so that the extraction process is easier to accomplish.

By the time the animal byproduct material reaches the separator 64, the fats have been released from the small particles, the protein material has been separated from the water, and the solid material is ready to be separated. The separator 64, which in this embodiment is a centrifuge, more specifically a tricanter, uses a specific adjustment called a pond depth to dictate the quality of separation of fats, proteins, and water. The tricanter allows for the separation of fats, protein and water in one step. After the tricanting process, the oil is up to about 99% pure and the water is up to about 92% pure. The oil is transported to an oil storage facility 74 via path 76 for sale to an oil processor, and the water is transported to the storage basin 22 via path 78.

The centrifuge in this embodiment is a CA 450-04-10 Separator Decanter available from Westfalia Separator, Inc., P.O. Box 178, 100 Fairway Court, Northvale, N.J. 07647. Nevertheless, the centrifuge can be any separator capable of separating the animal byproduct material leaving the heater 62 into oil, water and solids. As for the other components, the capacity of the separator is determined by the throughput of the system. The solids, or meal, that remain after the water and the oil are removed are transported to a dehydrator 82 via path 84.

En route to the dehydrator 82, feathers from the feather storage area 28 and blood from the blood storage area 12 are added to the meal in path 84. The blood passes through a coagulator 86 before entering path 84. The feathers and blood can bypass the grinder 60 because of the type of dehydrator used in the system, which will be described in greater detail below.

The dehydrator 82 reduces the moisture of the meal from about 35% to about 8%. The dehydrator in this particular embodiment is an AKT-KIX dehydrator available from AKT International PTY LTD, P.O. Box 4993, Kingston 2604 Australia. Such a dehydrator is described in U.S. Pat. No. 5,105,560.

Unlike a tumble dryer or a traditional plate or tray dryer, the dehydrator 82 of the present invention uses three different types of processes to remove the remaining moisture from the solid material that has left the separator 64. The dehydrator 82 uses an agitator, an impact temperature zone, and a cyclone to produce the final meal product. The agitator is a sizing fan blade setup that breaks clumped material into smaller particles to increase surface area. The feathers and blood can be added after the grinder 60 because the agitator can reduce the size of the feathers, thus performing a type of grinding. Also, since feathers are almost 100% protein, adding them before the grinder would require the separator to separate the protein from the feathers from the oil, water and protein from the other chicken byproducts.

The impact temperature zone is the area of the machine where heated air of approximately 350 degrees is introduced to the meal for a period of between about five and about seven seconds. For example, heated air is preferably directed into the protein meal to further remove water from the meal. During this time frame, sufficient heat is added to the product stream to dehydrate the remaining extra moisture in the protein meal. This "flash drying" process allows the protein meal to dry to a desired moisture content, about 8%, while not denaturing the protein as much as the traditional byproduct conversion process.

In a final stage in the dehydrator 82, the cyclone allows the meal to flow in a cyclonic pattern to ensure there is no clumping of the meal upon exit from the dehydrator. The meal product is transported to a meal cooler 94 via path 96. Accordingly, a granular protein meal that is more nutritious and digestible than protein meals produced by known methods is provided.

Other dehydrators can also be used. Such dehydrators can only have two stages, for example a drying and a cyclone stage. Other dehydrators may have three stages that are similar to the dehydrator described above.

After the moisture is driven from the meal, the air is transported to a biological scrubber 88 via path 92. The scrubber in this embodiment is a wet scrubber where minute particles and materials are scrubbed from a vapor stream. Such a scrubber in this embodiment is available from AC Corp., P.O. Box 16367, Greensboro, N.C., 27416; however, other biological scrubbers can be used.

Figure 2:
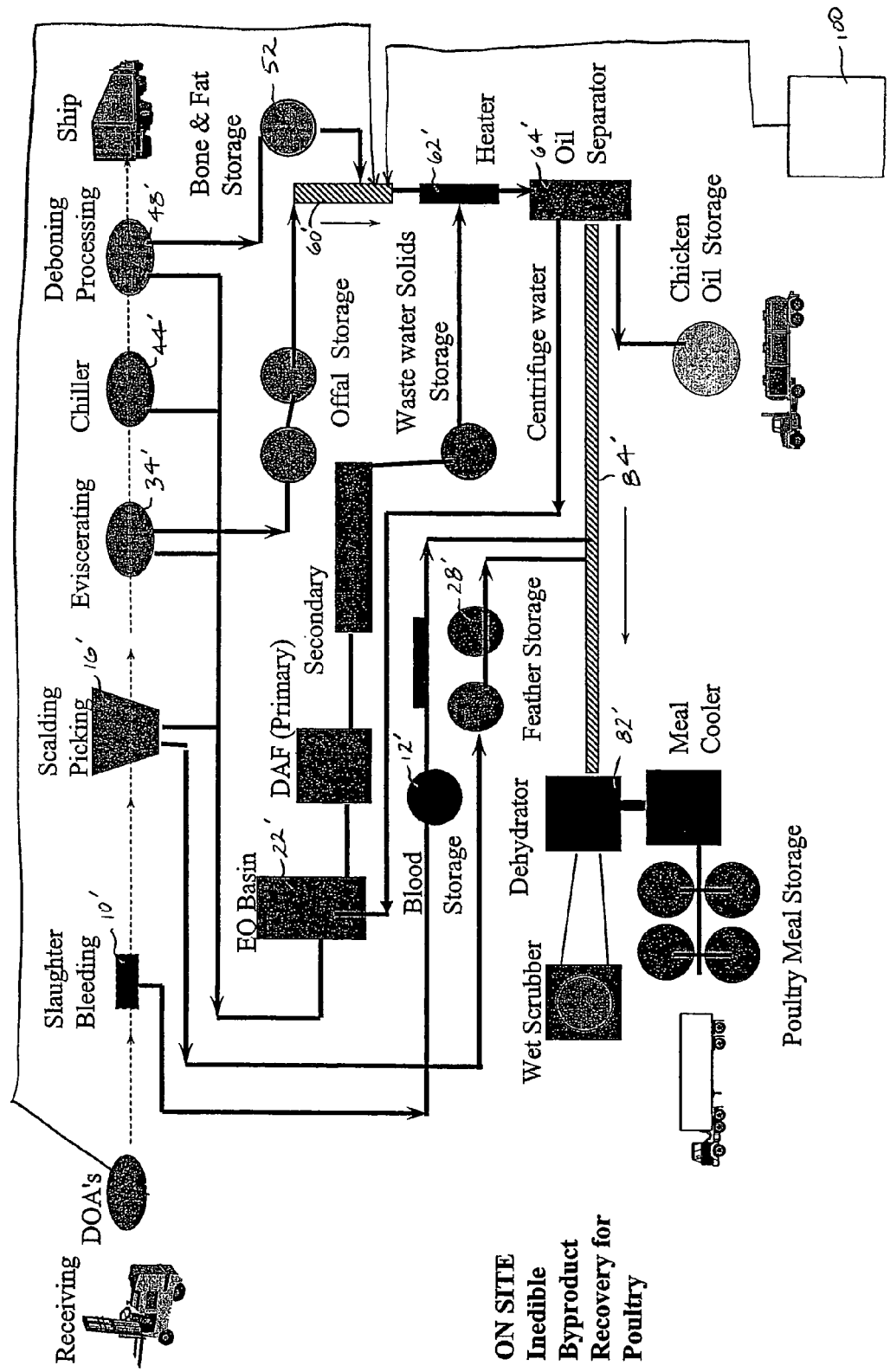
FIG. 2 is a flow diagram of a poultry processing system including a byproduct recovery system according to an alternative embodiment of the present invention.

In addition to the meal described above, compound feeds that introduce grain into the meal can also be produced using an alternative embodiment of the present invention. Referring to FIG. 2, an alternative embodiment of a poultry processing system and a byproduct recovery system is shown. In FIG. 2, like numerals having a primed (') suffix refer to like components and new numerals refer to new components.

A chicken processing system includes a slaughtering and bleeding area 10', a scalding and picking area 16', and eviscerating area 34', a chiller 44', and a deboning area 48' substantially as shown and described above. Blood from the slaughtering and bleeding area 10' is stored in a blood storage tank 12'. Water from the scalding and picking area 16', the eviscerating area 34', the chiller 44' and the deboning area 48' is stored in a storage basin 22'. Feathers from the scalding and picking area 14' are stored in a feather storage area 28'. Offal from the eviscerating area 34' is stored in an offal storage area 36'. Bone and fat from the deboning area 48' is stored in a bone and fat storage area 52'. Again, this arrangement of components and the processing steps associated therewith are substantially as shown and described above unless specifically noted otherwise.

DOAs, offal, bones and fat are fed into a grinder 60' along with grain, soy, cereal or the like, from a grain storage area 100. The animal byproduct and grain mixture then travels through a heater 62', a separator 64' and a dehydrator 82' in much the same manner as described above. Alternatively, the grain, soy, cereal or the like can be introduced to the animal byproduct between the separator 64' and the dehydrator 82' in a path 84'.

It is to be understood that the above described embodiments are merely illustrative principles of the invention and that many variations may be devised by those skilled in the art without departing from the scope of the invention. For example, even though the invention has been described with particularity referring to a poultry processing system, the inventive animal byproduct conversion system could be used in other animal processing systems, such as pork, beef, or fish. Obviously, in a system where the animal to be processed does not have feathers, this part of the system will be deleted. Furthermore, many different storage areas were described in the description, however the animal byproduct can be delivered directly to the grinder, thus obviating the need for the storage areas. It is, therefore, intended that such variations, as well as others not specifically mentioned, be included within the scope of the claims.

What is claimed is:

1. A method of recovering nutrients from animal byproducts comprising the steps of:
   grinding animal byproduct material;
   separating protein from the animal byproduct material to produce a meal;
   heating the animal byproduct material to at least about 160 degrees F. before segarating protein from the animal byproduct material; and
   drying the meal.

2. The method of claim 1, wherein said grinding step comprises the step of reducing the animal byproduct material to a particle size between about 4 mm to about 25 mm.

3. The method of claim 1, wherein the animal byproduct includes chicken bones.

4. The method of claim 1, wherein the animal byproduct includes the entire leftover portion of the animal being processed.

5. The method of claim 1, wherein said heating the animal byproduct material comprises the step of heating the animal byproduct material for about ten seconds.

6. The method of claim 1, wherein said heating the animal byproduct comprises the step of injecting steam into the animal byproduct material.

7. The method of claim 1, wherein said separating step further comprises the step of separating oil to about 99% pure and water to about 92% pure from the animal byproduct material.

8. The method of claim 1, further comprising the step of directing water separated from the animal byproduct material to a heating apparatus that heats the animal byproduct material by injecting steam into the animal byproduct material.

9. The method of claim 1, further comprising the step of adding a material from a group consisting of grain, cereal, soy and combinations thereof.

10. The method of claim 1, wherein said drying the meal comprises the step of passing the meal through air heated at about 350 degrees F. for about five to about seven seconds.

11. A system for recovering animal byproducts to provide protein meal that is less denatured and more digestible, the system comprising:

a grinder for reducing animal byproducts to a predetermined size;
   a heater downstream from said grinder;
   a centrifugal separator downstream from said heater; and
   a dehydrator receiving material from said separator and removing water therefrom.

12. The system of claim 11, wherein said grinder is adapted to reduce animal byproduct material to a diameter of about 4 mm.

13. The system of claim 11, wherein said grinder is adapted to grind animal byproduct material that includes chicken bones.

14. The system of claim 11, wherein said separator comprises a centrifuge adapted to separate animal byproduct into oil, water and solids.

15. The system of claim 11, wherein said heater is adapted to heat material from said grinder to at least about 160 degrees F.

16. The system of claim 11, further comprising a water conduit in communication with said separator and said heater, wherein water separated by said separator is directed toward said heater.

17. The system of claim 11, wherein said heater is adapted to introduce steam into animal byproduct material traveling through said heater.

18. The system of claim 11, wherein said dehydrator comprises an agitator, a drying duct, and a cyclone.

19. A method of recovering nutrients from animal byproducts to form a base material comprising the steps of:
   receiving animal byproduct material from an on-site poultry processing plant;
   grinding the animal byproduct material to between about 4 mm to about 25 mm particles;
   heating the particles in a continuous heater;
   separating the particles into water, fat, and protein material; and
   drying the protein material.

* * * * *